US008172517B2

(12) United States Patent
Lighty

(10) Patent No.: US 8,172,517 B2
(45) Date of Patent: May 8, 2012

(54) PASSIVE GUIDE VANE CONTROL

(75) Inventor: Kerry Jon Lighty, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1146 days.

(21) Appl. No.: 12/002,235

(22) Filed: Dec. 14, 2007

(65) Prior Publication Data

US 2008/0145206 A1 Jun. 19, 2008

Related U.S. Application Data

(60) Provisional application No. 60/875,639, filed on Dec. 19, 2006.

(51) Int. Cl.
*F04D 29/56* (2006.01)
*F01D 17/16* (2006.01)
(52) U.S. Cl. .................................. 415/156; 415/160
(58) Field of Classification Search .................. 415/155, 415/156, 159, 160, 162
See application file for complete search history.

(56) References Cited

U.S. PATENT DOCUMENTS

| | | | |
|---|---|---|---|
| 2,455,251 A | 11/1948 | Hersey | |
| 2,988,327 A | 6/1961 | Trowbridge et al. | |
| 3,957,392 A * | 5/1976 | Blackburn | 415/146 |
| 3,995,971 A | 12/1976 | White | |
| 4,050,844 A | 9/1977 | Miller et al. | |
| 4,324,526 A | 4/1982 | Berchtold et al. | |
| 4,363,600 A | 12/1982 | Thebert | |
| 4,693,073 A * | 9/1987 | Blackburn | 60/778 |
| 5,342,169 A | 8/1994 | Muller | |
| 5,472,314 A | 12/1995 | Delonge et al. | |
| 5,730,580 A * | 3/1998 | Japikse | 415/208.3 |
| 6,799,945 B2 | 10/2004 | Chatel et al. | |
| 7,722,318 B2 * | 5/2010 | Addis | 415/148 |
| 2003/0133782 A1 | 7/2003 | Holter et al. | |
| 2003/0147743 A1 | 8/2003 | Chatel et al. | |
| 2005/0135926 A1 | 6/2005 | Selby | |
| 2005/0254938 A1 | 11/2005 | Sheath et al. | |

* cited by examiner

*Primary Examiner* — Nathaniel Wiehe
(74) *Attorney, Agent, or Firm* — Krieg DeVault LLP

(57) ABSTRACT

A system for passively controlling a variable position guide vane in a turbo-machine. The system includes a shaft rotatable about an axis with an airfoil connected thereto. The shaft is biased toward a closed position, but will open in response to fluid flowing through a flowpath. The guide vane can then be locked in an open position at a desired operating condition of the turbo-machine.

20 Claims, 4 Drawing Sheets

PASSIVE GUIDE VANE CONTROL

CROSS REFERENCE

The present application claims the benefit of U.S. Patent Application No. 60/875,639, filed Dec. 19, 2006, which is incorporated herein by reference.

GOVERNMENT RIGHTS

The present invention was made with the United States Government under Contract No. N00014-04-D-0068, awarded by the United States Navy. The United States Government has certain rights herein.

FIELD OF THE INVENTION

The present invention relates to guide vanes on a turbo-machine, and more particularly to passive actuation and control of the same.

BACKGROUND

Turbo-machines such as gas turbine engines can have one or more stages of guide vanes positioned fore or aft of rotating stages in the compressor section and/or the turbine section of the engine. Static guide vanes direct the flow of working fluid in a desired direction to optimize a particular operating condition of the machine. Variable position guide vanes are used to maximize the efficiency of a machine over a range of operating conditions. Many prior variable position guide vane systems operate with a complex control algorithm and require expensive actuators and control hardware to link and position the guide vanes in a desired location at a particular operating condition. There is a need for a simple low cost solution for controlling guide vanes for in certain machines such as gas turbine engines.

SUMMARY

In one aspect the present invention discloses a passive guide vane system including a rotatable shaft movable between a fully open position and a closed position. An airfoil connected to the shaft is operable for guiding working fluid along a flow path of a turbo-machine. A biasing member operates with the system to bias the airfoil toward the closed position.

In another aspect, the present invention discloses a gas turbine engine having a section with at least one stage of variable position guide vanes and at least one stage of rotating blades positioned within a working fluid flow path. A passive control system is operable for controlling the position of the guide vanes.

In another aspect, the present invention discloses a method for controlling variable position guide vanes which includes biasing the vanes toward a closed position, flowing fluid through a flow path and causing the vanes to open in response to the momentum of the fluid flowing through the flow path.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
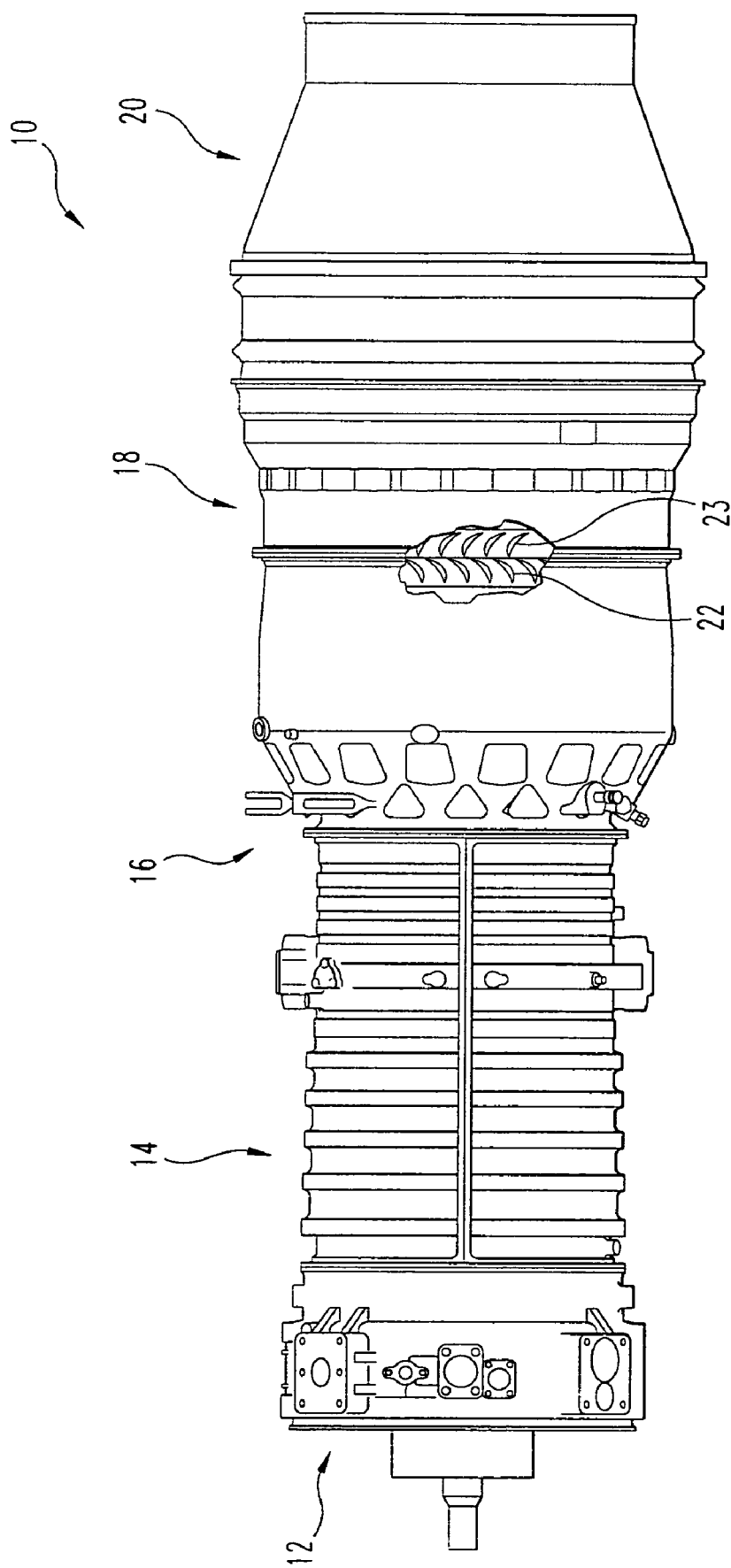
FIG. 1 is a side view of an exemplary embodiment of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The invention disclosed herein includes means for passively controlling guide vanes in a gas turbine engine or the like. The guide vanes can be positioned in the compressor section and/or the turbine section of the engine. Referring to FIG. 1, an exemplary embodiment of a gas turbine engine 10 is illustrated. The gas turbine engine 10 has an inlet 12 for drawing combustible air into a flow path of the engine 10. The engine 10 includes a compression section 14 which may have several relatively low-speed fan stages, as well as several relatively high-speed compressor stages. A combustor section 16 adds fuel to the air and ignites the fuel/air mixture. A turbine 18, which may have several high speed and low speed stages, is positioned downstream of the combustor 16 to extract work from the high energy exhaust fluid. After energy is extracted from the exhaust flow in the turbine 18, it can then exit through a nozzle 20. A cutaway of the turbine case illustrates one possible location of a guide vane stage 22 positioned adjacent a rotating stage 23. It should be understood that while a guide vane stage 22 is depicted in the turbine in this particular embodiment, that the guide vane stage 22 can be positioned in the compressor section 14 as would be known to those skilled in the art.

Figure 2:
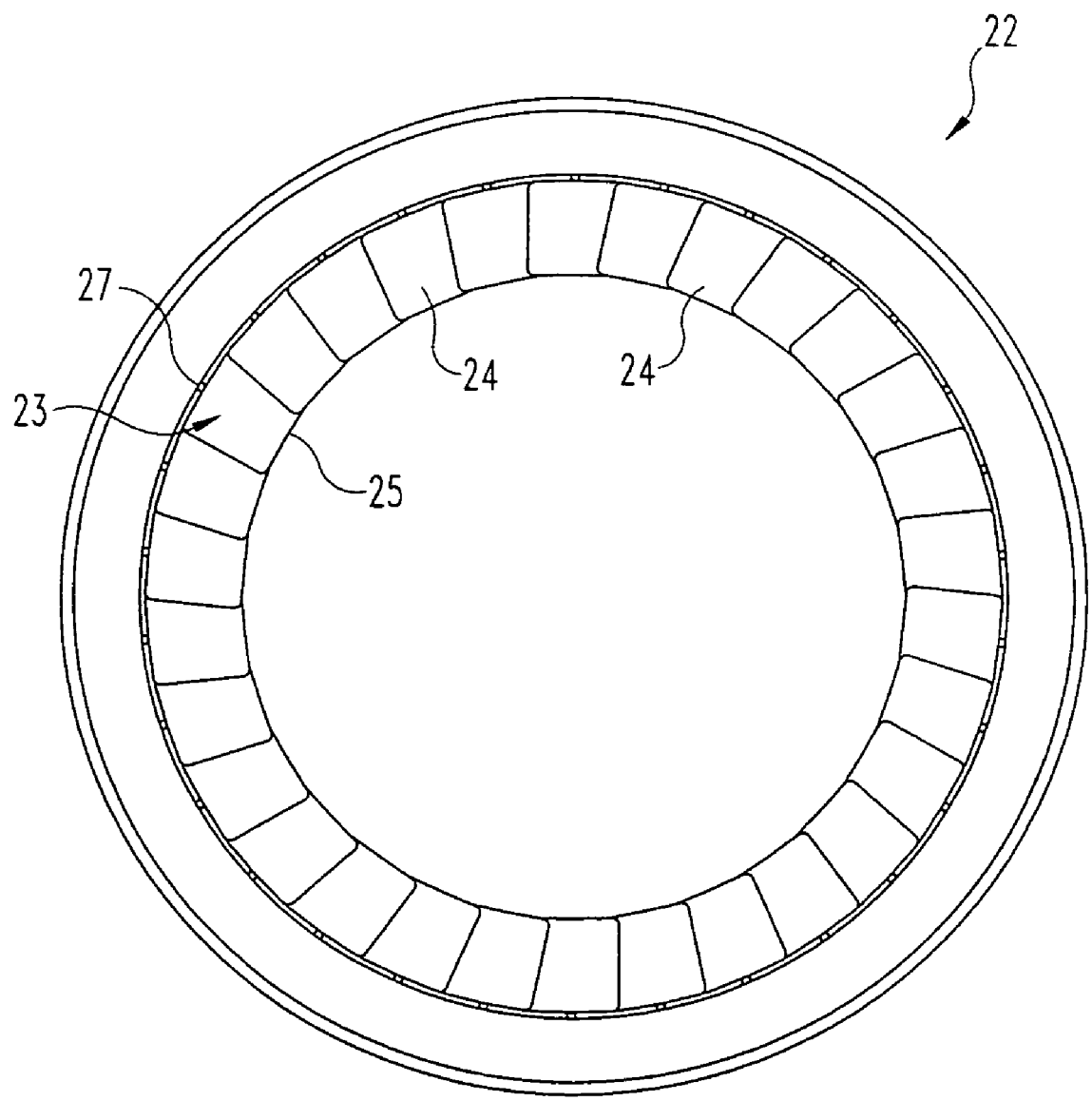
FIG. 2 is an end view of a guide vane stage in a closed position.
Figure 3:
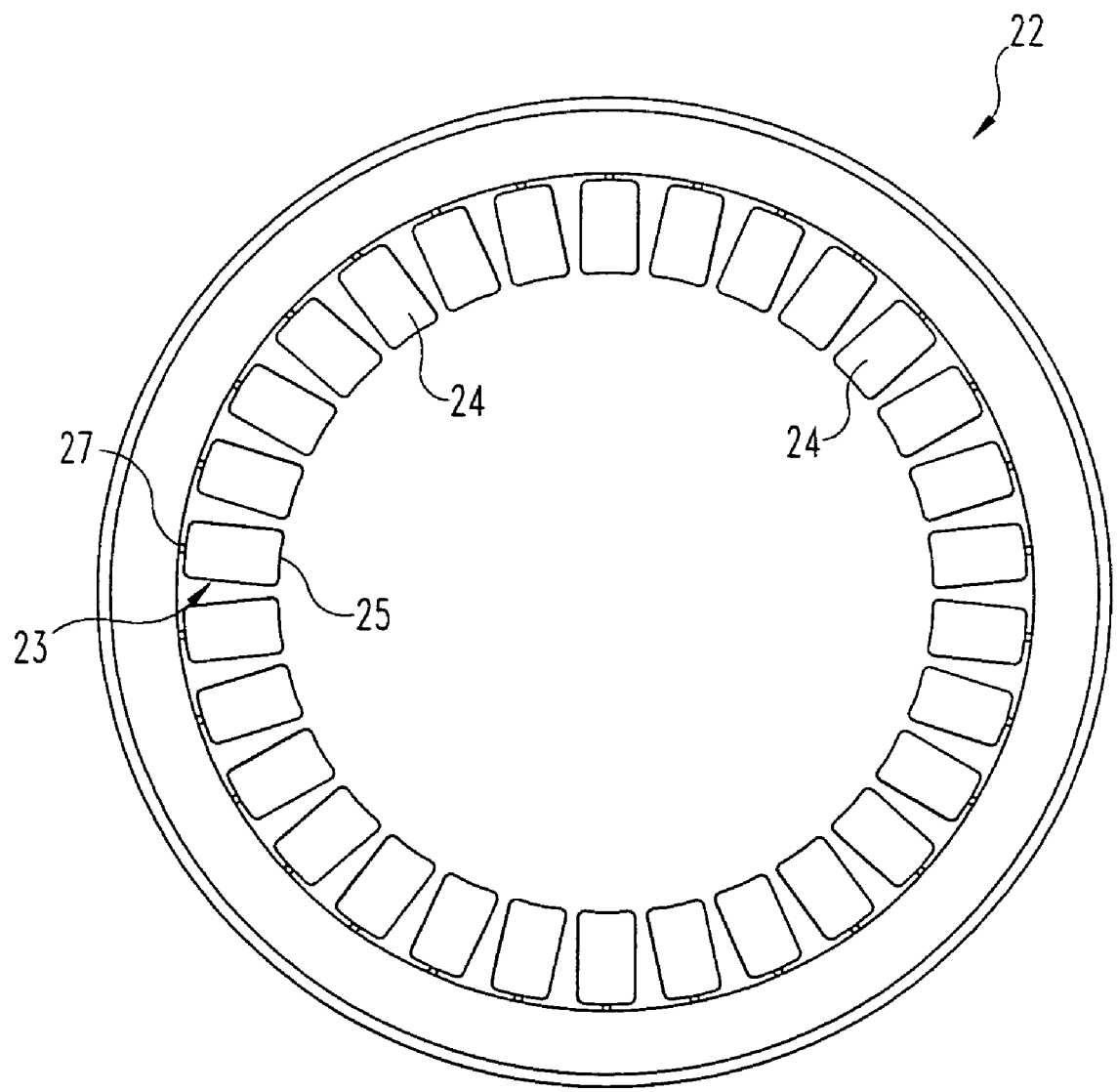
FIG. 3 is an end view of the guide vane stage of FIG. 2 in an open position.

Referring now to FIG. 2, an end view of the guide vane stage 22 is illustrated with individual vanes 24 in a closed position. A fluid flow path 23 substantially extends between a hub 25 and a tip 27 of the guide vanes 24 around the entire circumference of the guide vane stage 22. When the guide vanes 24 are closed, the working fluid flowing through the flow path 23 is restricted to a minimal level. FIG. 3 shows the guide vane stage 22 with the individual vanes 24 in an open position. The guide vanes 24 can vary in position anywhere from fully closed as shown FIG. 2 to a fully open position, which would correspond to the desired operating point of the engine 10.

Figure 4:
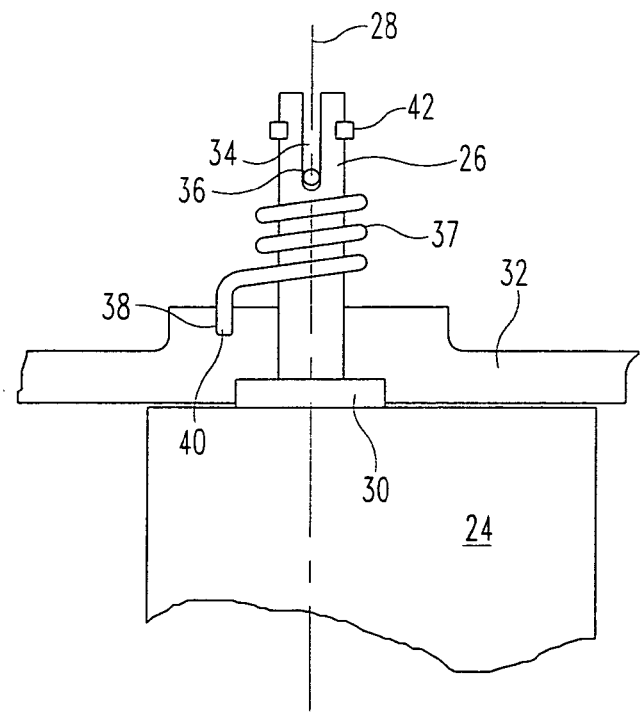
FIG. 4 is side view of one embodiment of a guide vane with passive control.

Referring to FIG. 4, one embodiment of a passively controlled guide vane 24 is shown with a portion of vane removed for clarity. The guide vane 24 is connected to a shaft 26, which is rotatable about an axis 28. The shaft 26 may include a low friction sleeve or bearing 30 which will provide a stable rotating support for the guide vane 24. A static structure 32 such as a compressor case or turbine case provides a suitable support for the bearing 30. The bearing 30 allows the vane 24 to rotate between fully open and closed positions. The shaft 26 can include a slot 34 or other connecting means for one end 36 of a torsion spring 37 to engage therewith. While a torsion spring is illustrated in this embodiment, it should be understood that the present application contemplates that other biasing mechanism can be utilized to urge the vane 24 toward a closed position. The biasing mechanism can include a variety of springs, such as coils or leaf springs and the like. An aperture 38 can be formed in the static structure 32 for an opposing end 40 of the spring 37 to engage and hold the spring 37 in place with respect to the structure 32. A retaining ring 42 may be used to prevent the end 36 of the spring 37 from disengaging with the slot 34 of the shaft 26.

Figure 5:
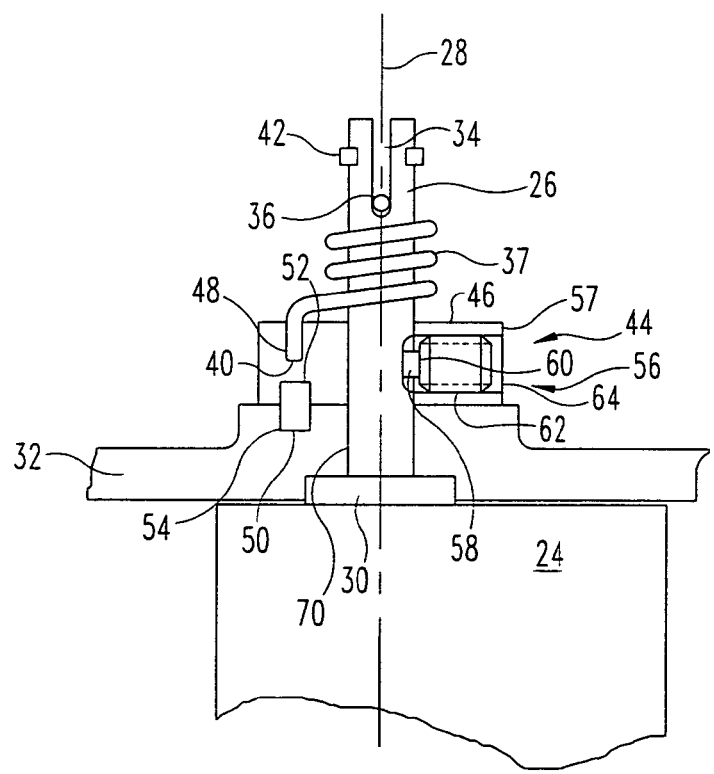
FIG. 5 is side view of an alternate embodiment of a guide vane with passive control.

Referring to FIG. 5, an alternate embodiment of the present invention is disclosed. The passively controlled guide vane 24 is substantially similar to the guide vane 24 illustrated in FIG. 4 with the addition of a locking mechanism 44 to lock the guide vane 24 in a desired position. The locking mechanism 44 can include a collar 46 positioned around the shaft 26 and adjacent the static support structure 32. The second end 40 of the spring 37 can be inserted into an aperture 48 formed in the collar 46. The collar 46 can be held in position relative to the static structure 32 with a dowel pin 50. The dowel pin 50 can be press fit into an aperture slot 52 formed in the collar 46 and an opposing aperture 54 formed in the static structure 32.

A detent system 56 is operable for locking the vane 24 in a desired position. The system 56 can include a spring housing 57 with a spring-loaded ball 58 biased toward the shaft 26. A detent slot or pocket 60 is formed in the shaft 26 such that when the shaft 26 rotates to a position where the spring-loaded ball 58 can slide into the detent slot 60 the shaft 26 is prevented from further rotation. The spring housing 57 can include external threads 62 to threadingly engage a tapped hole 64 formed in the collar 46. Other methods and forms of locking the shaft in a desired position as would occur to those skilled in the art are also contemplated by the present invention.

The guide vanes 24 can be integrally formed with the shaft 26 or alternatively can be attached via welding, brazing, or mechanical fasteners and the like. Installation of the vanes 24 requires that each shaft pass through an opening 70 in the static structure 32. Although not shown, each vane 24 can be held radially in position with an inner shroud or the like as would be known to those skilled in the art. A torsion spring 37 is then slid over the end of the shaft 26 such that one end 36 of the spring 37 engages through the slot 34 in the shaft 26. The other end 40 of the spring 37 can be pressed into the mating aperture 38 in the support structure 32. Various installation means and methods, other than press fitting, can be used to hold the spring 37 in the aperture 38 such as set screws, tack welding and other similar techniques. The torsion spring 37 biases the vane 24 toward the closed position, but is designed to permit the vane 24 to open as working fluid passes through the flowpath 23 of the turbo-machine.

In the alternative embodiment shown in FIG. 5, the installation is substantially similar to the embodiment of FIG. 4, with the addition of a locking mechanism 44. The collar 46 may be a separate piece from the static structure 32, in which case the collar 46 may be slid over the shaft 26 after the shaft 26 is installed or alternatively, the collar 46 may be attached to the static structure 32 prior to insertion of the shaft through the opening 70 in the static structure 32. Optionally, the locking mechanism 44 may be integrally formed with the static structure 32 with common manufacturing processes such as casting and machined forgings, etc.

Each of the components disclosed herein may be made from a variety of materials depending on the operating environment of the turbo-machine which includes temperature and pressure of the fluid. The material selection can range from thermoplastics for relatively low temperature and pressure applications to super alloys, composites, and ceramics for relatively high temperature and pressure applications.

In operation, the vanes 24 start in a closed position due to the force of the biasing mechanism 37. As the turbo-machine starts to rotate, working fluid passes through the flow path of the engine and the momentum of the working fluid will begin to force the vanes 24 open when the force due to the fluid momentum exceeds the bias force. In this manner, the vanes will open proportional to the flow rate of the working fluid. In one embodiment, the vanes 24 can be locked into a desired position once the vanes 24 are opened to a predetermined location. The locked position typically would correspond to a design operating point such as an aircraft flying at a predefined cruise altitude and mach number. The aircraft may be manned or unmanned, fixed wing airplane, rotorcraft, missile or launch vehicle. Alternatively, a passively actuated and controlled variable geometry guide vane system can be used in stationary machines such as gas turbine engines used in power generation, fluid pumping, fluid compression, and the like.

While the invention has been described in connection with what was presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A passive guide vane system comprising:
   a rotatable shaft moveable between a fully open position and a closed position;
   an airfoil connected to the shaft, the airfoil operable for guiding working fluid in a flow path of a turbo-machine;
   a biasing member operable for biasing the airfoil toward the closed position; and
   a retainer connected to the shaft for retaining the biasing member within an aperture formed in the shaft.

2. The system of claim 1, wherein momentum of the fluid flowing through the flow path causes the vane to move toward the fully open position.

3. The system of claim 1, wherein the fully open position corresponds to a desired operating condition of the turbo-machine.

4. The system of claim 1, wherein the biasing member is a spring.

5. The system of claim 4, wherein spring is one of a torsional, compression coil, tension coil, or leaf spring.

6. The system of claim 1, further comprising:
   a locking mechanism to hold the vane in the fully open position.

7. The system of claim 6, wherein the locking mechanism includes a ball detent with a set screw for position control.

8. The system of claim 7, wherein the locking mechanism includes a pocket formed in the shaft for receiving the detent ball.

9. The system of claim 1, further comprising:
a locking collar connecting the biasing member to static support structure.

10. The system of claim 1, wherein the turbo-machine is a gas turbine engine.

11. The system of claim 1, wherein the guide vane is positioned in one of a compressor section and a turbine section of a turbine engine.

12. A gas turbine engine comprising:
a section with at least one stage of variable position guide vanes and at least one stage of rotating blades positioned within a flow path for working fluid; and
a passive control system operable for controlling the position of the guide vanes; and
a locking mechanism to hold the vanes in the fully open position.

13. The turbine engine of claim 12, wherein the section is one of a compressor section and a turbine section.

14. The turbine engine of claim 13, further comprising:
a biasing member operable for biasing the vanes toward a closed position.

15. The turbine engine of claim 12, wherein momentum of the fluid flowing through the flow path causes the vanes to move toward a fully open position.

16. The turbine engine of claim 15, wherein the fully open position corresponds to a desired operating condition of the gas turbine engine.

17. A method for controlling variable position guide vanes comprising:
biasing the vanes toward a closed position;
flowing fluid through a flow path; and
opening the vanes in response to the momentum of fluid flow through the flow path; and
locking the vanes in a desired open position.

18. A passive guide vane system comprising:
a rotatable shaft moveable between a fully open position and a closed position;
an airfoil connected to the shaft, the airfoil operable for guiding working fluid in a flow path of a turbo-machine;
a biasing member operable for biasing the airfoil toward the closed position; and
a locking mechanism to hold the vane in the fully open position.

19. The passive guide vane system of claim 18 further comprising a retainer connected to the shaft for retaining the biasing member within an aperture formed in the shaft.

20. A passive guide vane system comprising:
a rotatable shaft moveable between a fully open position and a closed position;
an airfoil connected to the shaft, the airfoil operable for guiding working fluid in a flow path of a turbo-machine;
a biasing member operable for biasing the airfoil toward the closed position; and
a locking collar connecting the biasing member to static support structure.

* * * * *